3,278,464
PHOSPHONATED POLYMERS
Nicodemus E. Boyer, Chicago, Ill., and Raymond R. Hindersinn, Lewiston, and Claude Thomas Bean, Jr., Niagara Falls, N.Y., assignors to Hooker Chemical Corporation, Niagara Falls, N.Y., a corporation of New York
No Drawing. Filed Dec. 8, 1961, Ser. No. 158,105
23 Claims. (Cl. 260—2.5)

This invention relates to improved phosphorus-containing polymers and to a novel process for their preparation. In some of its more specific aspects, the invention further relates to a novel process for the preparation of improved castings, laminates, and foams from the phosphorus-containing polymers of the invention and to the products thus prepared.

A large number of ethylenically unsaturated alkyd or polyester resins are commercially available and have long been in widespread use. While these unsaturated polymers have many desirable and valuable properties which render them acceptable for many purposes, they do have deficiencies in many instances such as relatively low flame and weather resistance, and relatively low color, light and heat stability. Thus, the art has long sought a satisfactory process for improving one or more of these deficiencies while retaining the original desirable properties and thereby provide improved polymers.

It has been discovered that ethylenically unsaturated polymers, whether naturally occurring or synthetic in nature, may be reacted with certain phosphorus compounds to produce phosphorus-containing polymers, which retain the desirable properties of the original polymers and which also exhibit improved properties such as flame resistance, weather resistance, color stability, light stability and/or heat stability to a surprising degree. The resultant phosphonated polymers are usually much more satisfactory than the original polymers for their prior art uses, and they are also often useful for the first time in entirely new fields which demand the improved properties. Additionally, it has been further discovered that castings, laminates and foams prepared from the phosphonated polymers of the present invention also retain the desirable properties of the prior art products and exhibit the improved properties of the phosphonated polymers to an unexpected and surprising degree, and thus are likewise more suitable for prior art uses and may be useful for the first time in new applications which demand the improved properties.

It is a further object of the present invention to provide a novel process for preparing phosphorus-containing resins from ethylenically unsaturated alkyd or polyester resins, and to provide the improved resins thus prepared.

It is still a further object of the present invention to provide a novel process for preparing phosphorus-containing polymers which are curable upon reaction with a curing or cross-linking agent, and to provide the improved curable polymers thus prepared.

It is still a further object of the present invention to provide a novel process for preparing cured or cross-linked phosphorus-containing polymers from ethylenically unsaturated polymers, and to provide the improved polymers thus prepared.

It is still a further object of the present invention to provide a novel process for preparing improved castings, laminates, foams and/or reinforced plastic articles and to provide the improved materials thus prepared.

Still other objects and advantages of the present invention will be apparent to those skilled in the art upon reference to the following detailed description and the examples.

In accordance with the present invention, it has been discovered that ethylenically unsaturated polymers can be reacted with a phosphorus compound of the general formula:

$$(RO)_3P$$

wherein R is an organic radical, to produce phosphonated polymers. The organic radical R may be the same or different, and preferably is selected from organic radicals such as alkyl, cycloalkyl, alkenyl, aryl, alkylaryl, arylalkyl, and halosubstituted or other substituted organic radicals of the foregoing group containing substituents which do not interfere in the reaction with the ethylenically unsaturated polymer.

Among the preferred phosphorus compounds for use in practicing the invention are lower alkyl phosphites such as trimethyl phosphite, or lower alkenyl phosphites such as triallyl phosphite. Other specific phosphites that can be used are those wherein the radicals R are methyl, ethyl, isopropyl, butyl, hexyl, n-octyl, 2-ethylhexyl, decyl, hexadecyl, phenyl, benzyl, tolyl, cyclohexyl, allyl, crotonyl, beta-chloroethyl, beta-bromoethyl, beta-methoxyethyl, beta-ethoxyethyl, beta-butoxyethyl, beta-phenoxyethyl, tetra hydrofurfuryl, tetrahydropyranyl and mixtures thereof. Generally it is preferred that no more than two aryl substituents be utilized.

In general, the length of the carbon chains or number of carbon atoms in the aryl nuclei in the organic radicals of the phosphorus compound is not critical and may vary over wide ranges. The lower limit is the lowest possible number of carbon atoms such as one carbon atom in alkyl groups and six carbon atoms in aryl groups and the upper limit is practical in nature. However, a higher percent by weight of phosphorus may be incorporated into the polymer in instances where the organic radicals attached to the phosphorus atoms in the organic radicals R preferably should contain from 1 to about 6–8 carbon atoms. In some instances, it may be desirable to provide halogen-containing groups for R to further enhance the fire resistance and thereby obtain a still further improved polymer. Such a halogen-containing phosphorus compound can be a cyclic phosphite such as:

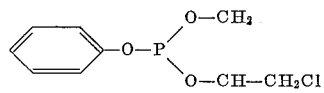

The R organic radicals also may be substituted with other noninterfering groups and especially those groups which further enhance the desirable properties of the polymers of the invention.

Such phophorus compounds readily react without the aid of a catalyst with unsaturated alkyd or polyester resins of the well known general types obtained by the reaction of polyols with unsaturated dibasic acids. These unsaturated alkyd or polyester resins containing aliphatic carbon-to-carbon double bonds may be referred to hereinafter as being unsaturated alkyd resins. The unsaturated alkyd resins that are reacted with the phosphorus compounds defined hereinbefore generally have at least one terminal carboxylic acid group per molecule that is conjugated with an aliphatic carbon-to-carbon double bond. Such a structure is graphically illustrated as follows:

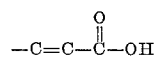

Usually the resins are terminated with more than one and preferably more than two such carboxylic acid groups. More particularly, the unsaturated alkyd resins for use in the invention are those having an acid number greater than 30, preferably greater than about 100. The acid number can vary up to about 500.

The unsaturated alkyd resins can also contain one or more internal aliphatic carbon-to-carbon double bonds per molecule that are conjugated with a carbonyl group.

Such an "internal" double bond is one that is conjugated with a carbonyl group that does not occur at the end of a polymer chain. Such a structure can be represented as follows:

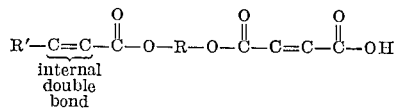

Alternatively the unsaturated alkyd resin can be terminated with one or more carbonyl groups such as are provided by reaction with aldehydes and ketones.

A suitable example of ethylenically unsaturated polymers include unsaturated alkyd or polyester resins containing combined chlorine such as disclosed in U.S. Patent 2,779,701, i.e., the reaction product of 1,4,5,6,7,7-hexachlorobicyclo(2.2.1)-5-heptene-2,3-dicarboxylic anhydride, ethylene glycol, diethylene glycol and maleic anhydride. Many other unsaturated polyesters of polycarboxylic acids and polyhydric alcohols disclosed in the prior art are also contemplated. Also suitable are such polymer compositions containing drying oils, semi-drying oils and similar unsaturated oils such as linseed oil, tung oil and the like.

Unsaturated alkyd resins containing substantially more than four esterified carboxylic acid groups are especially preferred. Such resins which are based upon maleic anhydride and ethylene glycol or other simple glycols have been found to be especially useful. However, unsaturated alkyd or polyester resins may be used which are prepared from other ethylenically unsaturated, and especially alpha-beta ethylenically unsaturated, dibasic acids, anhydrides, and acid halides, or mixtures thereof with saturated dibasic acids, anhydrides and acid halides. Specific examples of dibasic compounds include fumaric, aconitic, mesaconic, citraconic, ethyl maleic, pyrocinchonic, xeronic, itaconic, isosebacic, glutaric, pimelic, mono, di and trichloro ortho-phthalic, iso and terephthalic, phthalic, tetrachlorophthalic, succinic, adipic, suberic, azelaic, sebacic, and dimethyl succinic acids, their anhydrides, acid chlorides and lower alcohol esters where the alcohol portion of the ester may be alkyl, aryl, alkylaryl, arylalkyl, cycloalkyl, alkenyl or heterocycloalkyl such as tetrahydrofurfuryl. Halogen-substituted carboxylic compounds are sometimes desired.

The polyol portion of unsaturated alkyd or polyesters may be varied widely and includes materials and mixtures of materials such as ethylene glycol, 1,3-dipropanediol, 1,2-propylene glycol, dipropyleneglycol or di-1,3-propanediol, butylene glycol, glycerol, pentaerythritol, dipentaerythritol, trimethylolpropane, trimethylolethane, sorbitol, and mannitol. Halogen substituted polyols, such as glycerol chlorohydrin, and pentachlorophenoxy propane-2,3-diol also are sometimes used.

The phosphorus-containing compound used in practicing the present invention adds across the carbon-to-carbon double bonds present in the ethylenically unsaturated polymer. The reaction may be illustrated as follows when the ethylenically unsaturated polymer is an alkyd resin of the general type described above and the phosphorus-containing compound is trimethylphosphite:

action of the present invention is to be distinguished from the transesterification reactions of the prior art.

The temperature employed may vary over wide ranges, such as from about 20° C. up to about 200–250° C. or higher. Temperatures below about 130° C. give better results in some instances. The reaction rate increases at the higher temperatures as would be expected and shorter reaction times are required, while with decreased temperatures the reaction rate is slower and a longer reaction period is required. The reaction is carried out for a period of time sufficient to assure the addition of the phosphorus compound to the desired number of carbon-to-carbon double bonds, and reaction times and temperatures are not otherwise critical within the acceptable limits mentioned above. A solvent may be employed, if desired, and in instances where a solvent is employed it may be methanol, ethanol, butanol, ethylene glycol, methanol and acetone, ethanol, acetone, etc.

The phosphorus compound is added to the unsaturated polymer in an amount necessary to impart the desired degree of enhancement of flame resistance or other desirable properties mentioned herein. For maximum enhancement of fire resistance or other desired property, the polymer may be substantially completely saturated by addition of the phosphorus compound but often partially saturated, curable polymers are desired and thus less than the maximum possible amount is added. As a general rule, it is preferred that the polymer be reacted with sufficient phosphorus compound to provide from about 0.5 to about ten percent by weight of phosphorus in the phosphonated polymer. However, larger amounts of phosphorus can be added when desirable such as fifteen or twenty percent by weight of the phosphonated polymer.

In many instances, it is desirable that the polymer be reacted with the phosphorus compound in an amount to result in only partial saturation, and thereby retain ethylenic unsaturation in the phosphonated polymer after a desired degree of fire resistance has been imparted. In such instances, it is possible to react the resultant unsaturated phosphonated polymer with a suitable cross-linking or curing agent to thereby provide a cross-linked or thermoset polymer. While cross-linking or curing agents such as are conventional in the art may be used, including sulfur and equivalent substances, it is preferred that the unsaturated phosphonated polymer be copolymerized with a vinylidene monomer in the presence of a free radical catalyst to thereby cross-link and cure the same.

The vinylidene monomers useful in curing the unsaturated phosphonated polymers mentioned above include the common vinylic compounds or mixtures thereof capable of cross-linking ethylenically unsaturated polymer chains at their points of unsaturation and usually they contain the reactive group $H_2C=C<$. Specific examples include styrene, alpha methyl styrene, vinyl toluene, triallyl cyanurate, monochlorostyrene, dichlorostyrene, diallyl phthalate, diallyl maleate, unsaturated esters such as: vinyl acetate, methyl methacrylate, methyl acrylate, allyl acetate, diallyl phthalate, diallyl succinate, diallyl adipate, diallyl sebacate, diethylene glycol bis (allyl carbonate), triallyl phosphate, and vinyl chloride,

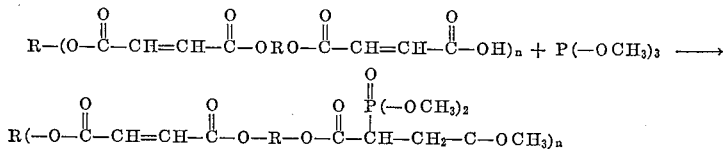

From the above, the phosphorus compound adds across the double bonds of the polymer and this results in decreased unsaturation with phosphorus atoms being attached directly to carbon atoms, which were present in the polymer prior to the reaction. Thus, the addition revinyl toluene, and the alkyl phosphonate esters such as tetraallyl phosphono succinate, triallyl phosphite, diallyl chlorendate, diallyl tetrachlorophthalate, the lower aliphatic esters others than methyl of methacrylic and acrylic acids, ethylene glycol diacrylate, dimethacrylate, diethacrylate, etc. The curing agent may be admixed in the phosphonated polymer in an amount sufficient to produce a thermoset polymer and the admixture heated to an elevated temperature to cross-link or cure the polymer.

The amount of unsaturation that should be left in the polymer following addition of the phosphorus compound is at least that amount necessary to allow cross-linking or copolymerization with the above-mentioned vinylidene monomers or other curing agents. Thus, a normal unsaturated alkyd or polyester resin prepared from maleic anhydride (three moles) and glycerol (one mole) can have somewhat less than two moles of trialkyl phosphite added to it per mole weight. The minimum amount of phosphorus compound to be added is that amount which may be added and still obtain some fire retardancy.

When unsaturated alkyd resins are prepared from alchohols having more than two alcoholic groups per molecule, such as trimethylolpropane, glycerol, etc., it is possible to obtain branched chain products which may be phosphonated in accordance with the invention. By adjustment of the ratios of reactants, materials having an acid number as low as 0 to 1.0 are obtainable and such materials are useful in preparing polyurethane foams by conventional reaction of the polyol resin residue with diisocyanate. In such instances, it is usually preferred to use alkyd resins wherein the phosphorus compound has reacted with substantially all of the carbon-to-carbon double bonds. The diisocyanate or polyisocyanate that may be employed is preferably liquid in order to readily react with the phosphonate resins of the invention.

A large number of various organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used; among them phenyl diisocyanate; alpha-naphthyl diisocyanate; 4-tolylene diisocyanate; n-hexyl diisocyanate; methylene-bis-(4-phenyl isocyanate); 3,3' - bitolylene - 4,4' - diisocyanate; 3,3' - dimethoxy-4,4'-biphenylene diisocyanate; 1,5-naphthalene diisocyanate; 2,4-chlorophenyl diisocyanate; hexamethylene diisocyanate; ethylene diisocyanate; trimethylene diisocyanate; tetramethylene diisocyanate; pentamethylene diisocyanate; decamethylene diisocyanate; 1,3-cyclopentylene diisocyanate; 1,2-cyclohexylene diisocyanate; 1,4-cyclohexylene diisocyanate; cyclopentylidene diisocyanate; cyclohexylidene diisocyanate; p-phenylene diisocyanate; m-phenylene diisocyanate; 4,4'-diphenyl propane diisocyanate; 4,4'-diphenyl methane diisocyanate; 1-methyl-2,4-phenylene diisocyanate; 4,4'-diphenylene diisocyanate; 1,2-propylene diisocyanate; 1,2-butylene diisocyanate; 2,3-butylene diisocyanate; 1,3-butylene diisocyanate; ethylidene diisocyanate; propylidene diisocyanate; butylidene diisocyanate; 1,3,5-benzene triisocyanate; 2,4,6-tolylene triisocyanate; 2,4,6-monochlorobenzene triisocyanate; 4, 4',4" - triphenylmethane triisocyanate; polymethylene polyphenylisocyanate and mixtures thereof. Higher isocyanates are provided by the liquid reaction products of (1) diisocyanates and (2) polyols or polyamines; etc. In addition, isothiocyanates and mixtures of isocyanates may be employed. Also contemplated are the many impure or crude polyisocyanates that are commercially available.

When the polyurethane compositions of the invention are foamed, any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees contigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

In preparing the polyurethane compositions the components are preferably reacted in a ratio sufficient to provide about eighty-five to one hundred and fifteen percent of isocyanate groups with respect to the total number of hydroxyl and carboxyl groups present in the hydroxyl-containing polymeric material (and the foaming agent, if one is provided). The reaction temperature generally ranges from about twenty to about one hundred and eighty degrees centigrade, although higher and lower temperatures can be used. The resultant phosphorus-containing foams exhibit fire retardance properties to a surprising degree or are even self-extinguishing.

In accordance with still other aspects of the invention, it is possible to employ the phosphonated polymers of the invention in the preparation of plastic articles, reinforced plastic articles and laminates or other filled resin compositions, and surprisingly such materials exhibit vastly superior fire retardance and may even be rendered self-extinguishing. Suitable reinforcements or laminations for preparing the reinforced articles and laminates include textile fibers or cloth, glass fibers or glass cloth, roving, etc. Castings may be prepared from the phosphonated polymers of the present invention and such products likewise have been found to exhibit fire retardance to a surprising degree and may even be rendered self-extinguishing. In general, well known processes of the prior art may be used for preparing the above-mentioned plastic articles, reinforced plastic articles, laminates or other filled resin compositions, castings, and foams, with the exception of substituting the phosphonated polymer of the present invention of the conventionally used ethylenically unsaturated polymer. Usually, other changes are not necessary. It is usually preferred that a thermoset polymer be present in the finished article.

The following are examples of suitable reinforcing media that can be used with the polymers of the invention: glass fibers, glass mats, glass cloth, synthetic fibers such as Orlon, mineral fibers such as asbestos, natural fibers such as cotton, silk and wool, and metallic fibers such as aluminum and steel.

Following are examples of fillers that can be used in the polymers of the invention: inorganic materials such as calcium carbonate, clay and pigments, and organic materials such as wood flour, cotton and rayon flock, sisal fibers and dyes.

The foregoing detailed description and the following specific examples are for purposes of illustration only, and are not intended to limit the invention.

EXAMPLE 1

Glyceryl tris-(1,3-butane diol) hexamaleate was prepared for subsequent reaction with trimethyl phosphite as follows:

Four moles of glycerol was added drop-wise to twelve moles of molten maleic anhydride at about sixty-five degrees centigrade with stirring. After completion of the addition, the mixture was heated for one hour at one hundred and twenty-five degrees centigrade to complete the preparation of glyceryl trimaleate, which was a clear, pale yellow liquid when hot, and a white solid at room temperature. To the glyceryl trimaleate at about seventy degrees centigrade was added twelve moles of 1,3-butane diol and 0.0036 mole of hydroquinone. The mixture was stirred and heated until it became a homogeneous, clear yellow liquid at about seventy degrees centigrade. Water was distilled preferably in an inert atmosphere first at one hundred and forty to one hundred and sixty degrees centigrade, and then at a reduced pressure (about two millimeters mercury absolute. The resulting glyceryl tris-(1,3-butane diol) trimaleate was a pale yellow viscous liquid having a molecular weight of about six hundred. Twelve moles of maleic anhydride was added to four moles of the trimaleate at about seventy degrees centigrade. The mixture was heated and stirred in an inert atmosphere at about eighty degrees centigrade until a homogeneous liquid was obtained. Then the mixture was heated with stirring for about six hours at one hundred and thirty to one hundred and forty degrees centigrade. The resulting glyceryl tris-(1,3-butane diol) hexamaleate was a clear, pale yellow liquid which could be poured at eighty degrees centigrade, and has a molecular weight of about nine hundred, and an acid number of about one hundred and ninety.

Ten moles of trimethyl phosphite was added drop-wise with stirring to four moles of glyceryl tris-(1,3-butane diol) hexamaleate. The polyester had been preheated to fifty-eight degrees centigrade prior to the addition, and no heating was required during the addition of the phosphite. The addition was completed in about two hours, and the phosphonated polyester was a clear, almost colorless liquid at about seventy degrees centigrade at the end of the phosphite addition step. The acid number was eleven. By continuing the heating for four and one-half hours at eighty degrees centigrade to drive the reaction to completion, the acid number was lowered to 5.2 and the phosphonated polyester was a yellow liquid which could be slowly poured at room temperature. Free phosphite content by iodine titration was 0.06 percent.

A fire-resistant casting was prepared by mixing one hundred parts of the above-described phosphonated polyester with forty parts of styrene and 1.4 parts powdered benzoyl peroxide and heating the mixture to eighty degrees centigrade for twenty-four hours. The resulting casting was clear, had a Barcol hardness of fifty, and a burning rate of 0.41 inch per minute. All burning tests in this and the preceding examples were run by the standard procedure, ASTM-D-757-49.

In Examples 2, 3, and 4, mole ratios of trimethyl phosphite to glyceryl tris-(1,3-butane diol) hexamaleate of 1, 2, and 3, respectively, were employed. Castings were prepared from the phosphonated polyesters as described in Example 1. In Example 5, triallyl phosphite was used for the phosphonation and twenty parts styrene, one percent ditertiary butyl peroxide, and one percent lauroyl peroxide were used for cross-linking the polymer. The reaction conditions and results are shown in Table I.

complete the removal of water. The acid number of the resulting products was 8.7.

One mole of the glyceryl tris-(1,2-propane diol) trimaleate was reacted with three moles of maleic anhydride at sixty degrees centigrade for six hours, followed by one hundred to one hundred twenty degrees centigrade for three hours. The resulting hexamaleate had an acid number of one hundred ninety-nine, and was a clear, pale yellow liquid.

Two and one-half moles of trimethyl phosphite was added drop-wise with stirring to one mole of glyceryl tris-(1,2-propane diol) hexamaleate over a period of two hours at eighty to ninety degrees centigrade. The resulting product was a light yellow liquid.

One hundred parts of the above-described phosphonated polyester was reacted with forty parts of styrene and 2.1 parts of benzoyl peroxide at a temperature of eighty degrees centigrade for twenty-four hours. The resulting casting was clear, had a Barcol hardness of fifty-five to sixty, and a burning rate of 0.35 inch per minute.

In Examples 7, 8, and 9, additional phosphonated polyesters are prepared from glyceryl tris-(1,2-propane diol) hexamaleate by reaction with trimethyl phosphite at various mole ratios. The reaction conditions and properties of the resulting products are also shown in Table I. In Example 10, the properties of the glyceryl tris-(1,2-propane diol) hexamaleate were determined for control purposes.

Using the same general procedure described in Example 1, additional phosphonated polyesters are prepared in the following examples using the indicated phosphorus compounds.

| | Phosphorus compound |
|---|---|
| 11 | Phenylethylene phosphite. |
| 12 | Tribenzyl phosphite. |
| 13 | Tolylethylene phosphite. |
| 14 | Tricyclohexyl phosphite. |

The resulting phosphonated polyesters are useful in preparing fire retardant cross-linked castings.

EXAMPLE 15

A phosphonated polyester was prepared and used to produce a polyurethane foam as follows:

278.6 parts of trimethylolpropane adipate having a hydroxyl number of 504 was reacted with 35.4 parts of maleic anhydride under a nitrogen atmosphere. The components were agitated at room temperature for two hours

TABLE I

| No. | Phosphonation Temperature °C. | Phosphite Addition Time, Hours | Acid Number of Phosphonated Polyester | Moles of Phosphite per mole of Hexamaleate | Properties of Castings | | |
|---|---|---|---|---|---|---|---|
| | | | | | Phosphorus Content, Wt. Percent | Barcol Hardness | Burning Rate, in./min. |
| 2 | 70 | 2.0 | | 1.0 | 2.8 | 60-63 | |
| 3 | 100 | 2.0 | 33.1 | 2.0 | 3.8 | 55-60 | 0.37 |
| 4 | 85-95 | 3.0 | 0.3-0.5 | 3.0 | 5.2 | 40-45 | 0.25 |
| 5 | 80-87 | 3.5 | 21.9 | 2.5 | 4.5 | 52-56 | 0.40 |
| 7 | | | | 1.0 | | 58-63 | 0.44 |
| 8 | 90-105 | 1.7 | 28.4 | 2.0 | 4.0 | 60 | 0.37 |
| 9 | 85-95 | 2.5 | 0.2 | 3.0 | | 45-50 | 0.25 |
| 10 | | | | 0 | 0 | 60 | 0.75 |

EXAMPLE 6

In a manner similar to that described in Example 1, glyceryl tris-(1,2-propane diol) hexamaleate was prepared for reaction with phosphites.

One mole of glyceryl trimaleate was reacted with 3.2 moles of 1,2-propane diol in the presence of 0.005 mole hydroquinone at a temperature of one hundred and thirty-five to one hundred and sixty degrees centigrade for four hours followed by one hundred and sixty degrees centigrade at 150 mm. mercury pressure for twelve hours to and allowed to stand overnight. Then the temperature was raised to 45-53 degrees centigrade for two hours, to 63-67 degrees for 1.5 hours and to 80-83 for one hour. The resulting polymer had an acid number of 67.5.

To 312.6 parts of the above-described polymer at 80 degrees centigrade was slowly added 39.6 parts of trimethyl phosphite over a period of seven minutes with agitation. The temperature at the end of the addition was 75 degrees. After fifteen minutes, the reaction mixture was heated at 77-83 degrees for two hours and at 80-

85 degrees for two hours. The resulting phosphonated polymer had a phosphorus content of about 1.7 percent and an acid number of 20.4.

A polyurethane foam was prepared by blending 70 parts of phosphonated polyester, 0.5 part of an organosilicone block copolymer surfactant type of silicone oil (designated Y-2824 by the Linde Company), 0.5 part of a mixture of 50 percent N-methylmorpholine and 50 percent dibutyltin dilaurate, 31 parts tolylene diisocyanate, and 15 parts trifluorochloromethane. The components were mixed for 45 seconds. The foam rose in five minutes and was cured for ten minutes at 80 degrees centigrade. The resulting foam was self-extinguishing on ignition and had a density of six pounds per cubic foot.

We claim:

1. A process for preparing a polymer containing phosphorus comprising reacting together (I) a reactive phosphite of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated alkyd resin which contains aliphatic carbon-to-carbon double bonds that are conjugated with carbonyl groups and is of an acid number greater than 30; to obtain a phosphonate polymer containing phosphorus atoms attached directly to carbon atoms which were present in the resin prior to reaction with the phosphorus compound.

2. A process for preparing a polymer containing phosphorus comprising heating together (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated alkyd resin which contains at least one carboxylic acid group per molecule that is conjugated with an aliphatic carbon-to-carbon double bond and is of an acid number greater than 30; to obtain a phosphonated polymer containing phosphorus atoms attached directly to carbon atoms which were present in the resin prior to reaction with the phosphorus compound, said phosphonated polymer containing at least 0.5 weight percent phosphorus.

3. The process of claim 2 wherein the phosphorus compound is trialkyl phosphite.

4. The process of claim 2 wherein the phosphorus compound is trimethyl phosphite.

5. The process of claim 2 wherein the phosphorus compound is triallyl phosphite.

6. A process for preparing a polymer containing phosphorus comprising heating together (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated alkyd resin which contains at least one carboxylic acid group per molecule that is conjugated with an aliphatic carbon-to-carbon double bond and is of an acid number greater than 30; the resin being reacted with an insufficient amount of phosphorus compound to react all of the carbon-to-carbon double bonds, to obtain a phosphonated polymer containing phosphorus atoms attached directly to carbon atoms which were present in the resin prior to the reaction with the phosphorus compound, said phosphonated polymer containing at least 0.5 weight percent phosphorus.

7. The process of claim 6 wherein the phosphorus compound is a trialkyl phosphite.

8. The process of claim 6 wherein the phosphorus compound is trimethyl phosphite.

9. The process of claim 6 wherein the phosphorus compound is triallyl phosphite.

10. A process for preparing a thermoset polymer containing phosphorus comprising the steps of admixing (A) the phosphonated polymer resulting from reacting (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated thermoplastic alkyd resin which contains at least one carboxylic acid group per molecule that is conjugated with an aliphatic carbon-to-carbon double bond and is of an acid number greater than 30; the resin being reacted with an insufficient amount of phosphorus compound to react all the carbon-to-carbon double bonds to obtain a phosphonated polymer containing aliphatic carbon-to-carbon double bonds and phosphorus atoms attached directly to carbon atoms which were present in the resin prior to the reaction with the phosphorus compound, said phosphonated polymer containing at least 0.5 weight percent phosphorus, with (B) a cross-linking agent therefor in an amount effective to produce a thermoset polymer, and heating the admixture to an elevated temperature to react the phosphonated polymer together with the cross-linking agent and produce a thermoset polymer.

11. A process for preparing a thermoset polymer containing phosphorus comprising admixing (A) the unsaturated phosphonated polymer resulting from heating together (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated thermoplastic alkyd resin which contains at least one carboxylic acid group per molecule that is conjugated with an aliphatic carbon-to-carbon double bond and is of an acid number greater than 30; the alkyd resin being reacted with an insufficient amount of phosphorus compound to react with all of the carbon-to-carbon double bonds, to obtain a phosphonated polymer containing aliphatic carbon-to-carbon double bonds and phosphorus atoms attached directly to carbon atoms which were present in the resin prior to reaction with the phosphorus compound, said phosphonated polymer containing at least 0.5 weight percent phosphorus, with (B) a vinylidene monomer copolymerizable therewith in an amount to produce a thermoset polymer, and then, reacting the phosphonated polymer and vinylidene monomer in the presence of a free radical catalyst to produce a thermoset polymer.

12. A process for preparing a polyurethane composition containing phosphorus comprising reacting (A) the phosphonated polymer resulting from heating together (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated thermoplastic alkyd resin which contains at least one carboxylic acid group per molecule that is conjugated with an aliphatic carbon-to-carbon double bond and is of an acid number greater than 30; the alkyd resin being reacted with a sufficient amount of the phosphorus compound to react with substantially all of the carbon-to-carbon double bonds, to obtain a phosphonated polymer containing phosphorus atoms attached directly to the carbon atoms which were present in the resin prior to the reaction with the phosphorus compound, said phosphonated polymer containing at least 0.5 weight percent phosphorus, with (B) an organic polyisocyanate in an amount sufficient to provide about 85 to 115 percent of isocyanate groups with respect to the total number of hydroxyl and carboxyl groups present in the polymeric material.

13. The process of claim 12 wherein the reaction of the phosphonated polymer with an organic polyisocyanate is carried out in the presence of a foaming agent to produce a polyurethane foam.

14. A phosphorus-containing polymeric reaction product of components comprising (I) a reactive phosphite of formula $(RO)_3P$ and (II) an unsaturated alkyd resin which contains aliphatic carbon-to-carbon double bonds that are conjugated with carbonyl groups and having an acid number greater than 30, wherein each R is independently selected from the group consisting of alkyl, cycloalkyl, alkenyl, aryl, alkyaryl, arylalkyl, haloalkyl, beta-methoxyethyl, beta-ethoxyethyl, beta-butoxyethyl, beta-phenoxyethyl, tetrahydrofurfuryl and tetrahydropyranyl, the polymer containing phosphorus atoms attached directly to carbon atoms which were present in the polymer prior to reaction with the phosphite compound.

15. The phosphorus-containing polymer of claim 14 wherein the phosphorus compound is a trialkyl phosphite.

16. The phosphorus-containing polymer of claim 14 wherein the phosphorus compound is trimethyl phosphite.

17. The phosphorus-containing polymer of claim 14 wherein the phosphorus compound is triallyl phosphite.

18. A curable phosphorus-containing polymeric reaction product of (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) an unsaturated alkyd resin which contains at least one carboxylic acid group per molecule that is conjugated with an aliphatic carbon-to-carbon double bond and has an acid number greater than 30, the resin being reacted with an insufficient amount of phosphorus compound to react with all of the carbon-to-carbon double bonds and the resultant unsaturated phosphonated polymer containing aliphatic carbon-to-carbon double bonds and phosphorus atoms attached directly to carbon atoms which were present in the polymer prior to the reaction with the phosphorus compound, said phosphonated polymer containing at least 0.5 weight percent phosphorus.

19. A thermoset phosphorus-containing polymeric reaction product of components comprising (A) the reaction product of (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) a thermoplastic unsaturated alkyd resin which contains at least one carboxylic acid group per molecule that is conjugated with an aliphatic carbon-to-carbon double bond and has an acid number greater than 30, and (B) a cross-linking agent; the alkyd resin being reacted with an insufficient amount of the phosphorus compound to saturate all of the carbon-to-carbon double bonds, and the unsaturated phosphonated polymer containing aliphatic carbon-to-carbon double bonds and the phosphorus atoms attached directly to carbon atoms which were present in the resin prior to reaction with the phosphorus compound, said phosphonated polymer containing at least 0.5 weight percent phosphorus.

20. An article comprising the thermoset polymer of claim 19.

21. A thermoset phosphorus-containing polymeric reaction product of components comprising (A) the reaction product of (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) a thermoplastic unsaturated alkyd resin which contains at least one carboxylic acid group per molecule that is conjugated with an aliphatic carbon-to-carbon double bond and has an acid number greater than 30; (B) a vinylidene monomer, and (C) a free radical catalyst; the alkyd resin being reacted with an insufficient amount of the phosphorus compound to saturate all of the carbon-to-carbon double bonds, and the unsaturated phosphonated polymer containing aliphatic carbon-to-carbon double bonds and the phosphorus atoms attached directly to the carbon atoms which were present in the resin prior to reaction with the phosphorus compound, said phosphonated polymer containing at least 0.5 weight percent phosphorus.

22. A polyurethane composition comprising the reaction product of the components comprising (A) the reaction product of (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl beta-phenoxyethyl, tetrahydrofurfuryl and tetrahydropyranyl, and (II) a thermoplastic unsaturated alkyd resin which contains at least one carboxylic acid group per molecule that is conjugated with an aliphatic carbon-to-carbon double bond and has an acid number of greater than 30; and (B) an organic polyisocyanate; the alkyd resin being reacted with a sufficient amount of the phosphorus compound to saturate substantially all of the carbon-to-carbon double bonds, and the phosphonated polymer containing phosphorus atoms attached directly to the carbon atoms which were present in the polymer prior to the reaction with the phosphorus compound, said phosphonated polymer containing at least 0.5 weight percent phosphorus.

23. A polyurethane foam comprising the reaction product of the components comprising (A) the reaction product of (I) a reactive phosphorus compound of the formula $(RO)_3P$ wherein each R is independently selected from the group consisting of alkyl, cycloalkyl, alkenyl, aryl, alkylaryl, arylalkyl, haloalkyl, beta-methoxyethyl, beta-ethoxyethyl, beta-butoxyethyl, beta-phenoxyethyl, tetrahydrofurfuryl and tetrahydropyranyl, and (II) a thermoplastic unsaturated alkyd resin which contains at least one carboxylic acid group per molecule that is conjugated with an aliphatic carbon-to-carbon double bond and has an acid number of greater than 30; (B) an organic polyisocyanate; and (C) a foaming agent; the alkyd resin being reacted with a sufficient amount of the phosphorus compound to saturate substantially all the carbon-to-carbon double bonds, and the phosphonated polymer containing phosphorus atoms attached directly to the carbon atoms which were present in the polymer prior to the reaction with the phosphorus compound, said phosphonated polymer containing at least 0.5 weight percent phosphorus.

References Cited by the Examiner

UNITED STATES PATENTS

| | | | |
|---|---|---|---|
| 2,437,046 | 3/1948 | Rothrock et al. | 260—75 |
| 2,577,281 | 12/1951 | Simon et al. | 260—2.5 |
| 2,824,085 | 2/1958 | Cummings | 260—75 |
| 3,196,190 | 7/1965 | Nischk et al. | 260—75 |

FOREIGN PATENTS 1,106,489   5/1961   Germany.

LEON J. BERCOVITZ, *Primary Examiner.*

DONALD E. CZAJA, *Assistant Examiner.*